UNITED STATES PATENT OFFICE.

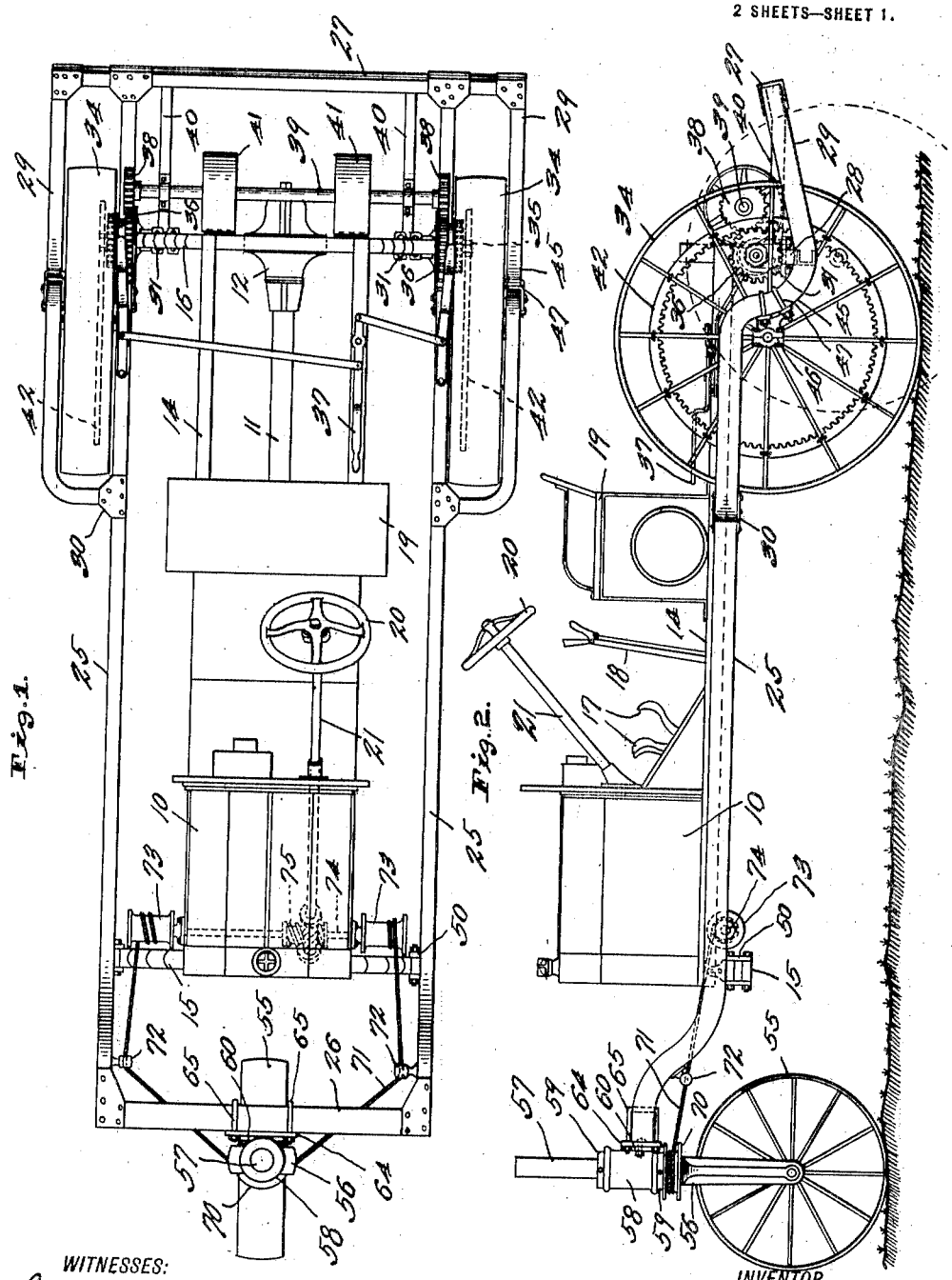

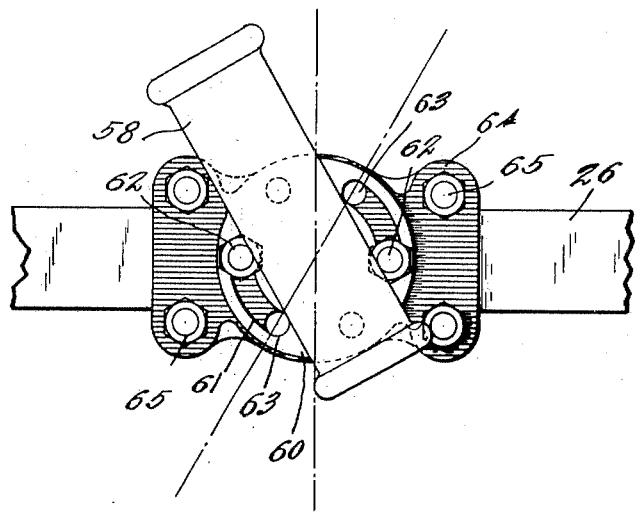
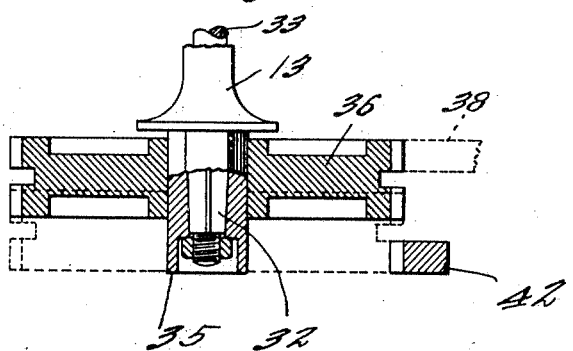

BERT A. RUPPRECHT, OF INDIANAPOLIS, INDIANA.

TRACTOR.

1,258,362.  Specification of Letters Patent.  Patented Mar. 5, 1918.

Application filed November 8, 1916. Serial No. 130,155.

*To all whom it may concern:*

Be it known that I, BERT A. RUPPRECHT, a subject of the King of England, residing at Indianapolis, in the county of Marion and State of Indiana, have invented a new and useful Tractor, of which the following is a specification.

It is the object of my invention to produce a tractor from an ordinary pleasure automobile, and to make use of the entire pleasure automobile as a unit, with the exception of the front axle and wheels and the rear wheels, and to operate and control the tractor by the operating and control mechanism of the pleasure automobile.

In carrying out my invention, I provide a tractor frame having rear traction wheels and a front guiding wheel or wheels, and support the pleasure automobile with its power plant and steering mechanism but with its front axle and wheels and its rear wheels removed in this tractor frame, interconnect the steering gear of the pleasure automobile with the guiding wheel of the tractor frame, and provide pinions on the end of the rear axle of the pleasure automobile for meshing with internal gears on the traction wheels of the tractor frame. In addition, I mount these traction wheels in the tractor frame so that they are individually adjustable to various positions about the rear axle of the pleasure automobile, so as to permit the traction wheels to operate on different levels without tilting the tractor frame. Furthermore, I preferably provide a jack shaft on the rear of the tractor frame, and make this jack shaft and the internal gears on the traction wheels alternately connectible to the rear axle of the pleasure automobile, so that the power plant of the pleasure automobile may be used either to drive the tractor or to drive such jack shaft, which in turn may be used as a source of power for any desired purpose.

The accompanying drawings illustrate my invention. Figure 1 is a plan view of a tractor construction in accordance with my invention; Fig. 2 is a side elevation thereof; Fig. 3 is a front elevation on a larger scale of the mounting for the guiding wheel; and Fig. 4 is a detail of the mounting of the shiftable pinion on the end of the rear axle of the pleasure automobile.

The pleasure automobile which is the basis for the tractor is shown as of a well-known type, in which the engine under the hood 10 at the front drives a rearwardly extending shaft 11 leading to the differential 12 at the center of the rear axle casing 13, the frame 14 of this pleasure automobile being supported by a front spring 15 and a rear spring 16, the latter being suitably mounted at its ends on the rear axle casing 13. The engine is provided with the usual control mechanism, and is connectible to the rearwardly extending shaft 11 for either direction of motion and with different gear ratios in a common manner, as by means of the control pedals 17 and hand lever 18 operable from the driver's seat 19. The pleasure automobile is also provided with the usual steering wheel 20 mounted on the oblique steering post 21.

The tractor frame comprises longitudinal side bars 25, a front cross bar 26, a rear cross bar 27 having its ends projecting beyond the end of the side bars 25, an axle-supporting cross bar 28 joining the side bars 25 near their rear ends, and supplementary side bars 29 extending from the projecting ends of the rear cross bar 27 forward for a distance in a plane parallel to the side bars 25 and then bent inward for attachment by attaching plates 30 to intermediate points on said cross bars 25.

The rear axle casing 13 of the pleasure automobile is bolted to the axle-supporting cross bar 28 by U-bolts 31 so that the ends 32 of the rear axle shaft 33 mounted in the rear axle casing 13 project past the side bars 25 into the spaces between such side bars and the supplemental side bars 29. In these spaces are mounted the two traction wheels 34 respectively. On the shaft ends 32, which are tapered and splined or castellated in the usual manner to provide for driving the rear wheels of a pleasure automobile in the ordinary use of the latter, (which rear wheels are removed when the tractor is formed,) there are mounted castellated sleeves 35 (Fig. 4), on which are axially slidable spur pinions 36, which may be moved axially of the sleeves 35 by suitable shifting mechanism 37, controlling in common the two pinions 36 to shift them simultaneously inward or outward. When shifted inward, as shown in full lines in Figs. 1 and 4, the spur pinions 36 mesh with spur gears 38 on a jack shaft 39 suitably mounted in the tractor frame, as on bars 40 extending between the rear cross bar 27 and the axle-supporting cross bar 28. The jack shaft 39 may be used as a source of power for any desired purpose, being provided with suitable connecting means, such as pulleys 41, for that purpose. When shifted outward, as shown in dotted lines in Fig. 4, the spur pinions 36 mesh with internal gears 42 mounted on the traction wheels 34.

The side bars 25 and the supplemental side bars 29 are provided with arc-shaped portions 45 forward of and below the rear axle casing 13 and having the latter for a common center. The bearings 46 for the tractor wheels 34 are clamped by U-bolts 47 to these arc-shaped portions 45, so that by loosening these U-bolts 47 the bearings 46 and consequently the axes of the traction wheels 34 may be shifted in arcs about the center of the rear axle casing 13, thus varying the height of the traction wheels with relation to the tractor frame while maintaining the internal gears 42 constantly in mesh with the spur pinions 36. This makes it possible to maintain the tractor frame level while permitting the traction wheels 34 to run on different levels, as is clear from the full and dotted lines in Fig. 2. The traction wheels are thus adjustable independently, for each is supported independently of the other in the space between the side bar 25 and its associated supplemental side bar 29.

The front end of the pleasure automobile is supported from a tractor frame by spring shackles 50 suitably joining the ends of the front spring 15 to points on the side bars 25, the front axle of the pleasure automobile being completely removed, and the same spring shackles 50 being used as are ordinarily used for connecting the spring 15 to such front axle.

The tractor is shown as having a single front guiding wheel 55. This is mounted in a fork 56 on a cylindrical stem 57 which projects upward through a tubular bearing 58 and is provided with adjustable collars 59 for abutting against the upper and lower ends of the tubular bearing 58, so that, by adjustment of such collars 59 to different points on the stem 57 the front end of the tractor frame may be adjusted in height. The tubular bearing 58 is provided with a circular attaching flange 60 provided with arc-shaped slots 61 for receiving attaching bolts 62 passing through holes 63 in a plate 64 clamped to the front cross bar 26 by U-bolts 65. By loosening the bolts 65, the front wheel may be shifted laterally of the tractor frame, or along the front cross bar 26. By loosening the bolts 62, and if necessary shifting them to different holes 63, the tubular bearing 68 may be tilted to different angles, so as to change the angularity of the plane of the guiding wheel 55, should that be desirable.

The stem 57 has fixed thereon at its lower end a pulley 70, around which a steering cable 71 extends. The ends of this steering cable lead through two eyes 72 mounted on the tractor frame to two winding drums 73 mounted on the end of a horizortal shaft 74 connected by worm gearing 75 to the lower end of the oblique steering post 21. Thus by operating the steering wheel 20 the guiding wheel 25 is turned about the axis of the stem 57 to obtain the desired steering of the tractor.

I claim as my invention:

1. In combination, a tractor frame having a single front guiding wheel and a pair of traction wheels, and means for supporting in said frame an automobile with its wheels removed and its driving axle connected to said traction wheels and its steering mechanism connected to said guiding wheel.

2. In combination, a tractor frame provided with a cross bar, a supporting plate mounted on said cross bar and adjustable therealong to different positions laterally of the tractor frame, a bearing provided with an attaching plate and adjustably attachable to said supporting plate in different angular positions, a stem mounted in said bearing, and a guiding wheel mounted on said stem.

3. In combination, a tractor frame provided with a cross bar, a supporting plate mounted on said cross bar and adjustable therealong to different positions laterally of the tractor frame, a bearing provided with an attaching plate and adjustably attachable to said supporting plate in different angular positions, a stem mounted in said bearing, and a guiding wheel mounted on said stem, said stem being axially adjustable in said bearing to vary the height of said cross bar.

4. In combination, a tractor frame provided with a cross bar, a supporting plate mounted on said cross bar and adjustable therealong to different positions laterally of the tractor frame, a bearing carried by said supporting plate, a stem mounted in said bearing, and a guiding wheel mounted on said stem, said stem being axially adjustable in said bearing to vary the height of said cross bar.

5. In combination, a tractor frame having side bars and cross bars, and also having supplemental side bars spaced from the side bars, said side bars and cross bars each having arc-shaped portions, a traction wheel mounted in the space between each side bar and the adjacent supplemental side bar, and bearings for the traction wheel mounted on said arc-shaped portions and adjustable to different positions therealong.

6. In combination, a tractor frame having side bars and cross bars, and also having supplemental side bars spaced from the side bars, said side bars and cross bars each having arc-shaped portions, a traction wheel mounted in the space between each side bar and the adjacent supplemental side bar, and bearings for the traction wheel mounted on said arc-shaped portions and adjustable to different positions therealong, the bearings for each traction wheel being independent of those for the other.

7. In combination, a tractor frame having side bars and cross bars, and also having supplemental side bars spaced from the side bars, said side bars and cross bars each having arc-shaped portions, a traction wheel mounted in the space between each side bar and the adjacent supplemental side bar, bearings for the traction wheel mounted on said arc-shaped portions and adjustable to different positions therealong, and means for supporting the power plant and transmission mechanism of an automobile so that the rear axle thereof lies in the axes of said arc-shaped portions.

8. In combination, a tractor frame having side bars and cross bars, and also having supplemental side bars spaced from the side bars, said side bars and cross bars each having arc-shaped portions, a traction wheel mounted in the space between each side bar and the adjacent supplemental side bar, bearings for the traction wheel mounted on said arc-shaped portions and adjustable to different positions therealong, the bearings for each traction wheel being independent of those for the other, and means for supporting the power plant and transmission mechanism of an automobile so that the rear axle thereof lies in the axis of said arc-shaped portions.

9. In combination, a tractor frame having a traction wheel at each side, means on said frame for supporting an automobile with its wheels removed and its rear axle projecting within said traction wheels, internal gears on said traction wheels for meshing with pinions on said rear axle ends, and bearings for said traction wheels, said bearings being adjustable about the axis of said rear axle.

10. In combination, a tractor frame having guiding and traction wheels, attaching means for attaching to said frame the front end of an automobile by the front spring of the latter, means for attaching to said frame the rear axle of said automobile, the rear wheels and front axle and wheels of the automobile being removed, pinions mounted on the ends of the rear axle of said automobile, and internal gears carried by said traction wheels and meshing with said pinions.

11. In combination, a tractor frame having guiding and traction wheels, attaching means for attaching to said frame the front end of an automobile by the front spring of the latter, means for attaching to said frame the rear axle of said automobile, the rear wheels and front axle and wheels of the automobile being removed, pinions mounted on the ends of the rear axle of said automobile, and internal gears carried by said traction wheels and meshing with said pinions, said traction wheels being mounted in said tractor frame so that they are independently adjustable about the axis of said rear axle.

12. In combination, a tractor frame having guiding and traction wheels, attaching means for attaching to said frame the front end of an automobile by the front spring of the latter, means for attaching to said frame the rear axle of said automobile, the rear wheels and front axle and wheels of the automobile being removed, pinions mounted on the ends of the rear axle of said automobile, and internal gears carried by said traction wheels and meshing with said pinions, said traction wheels being mounted in said tractor frame so that they are adjustable about the axis of said rear axle.

In witness whereof, I have hereunto set my hand at Indianapolis, Indiana, this sixth day of November, A. D. one thousand nine hundred and sixteen.

BERT A. RUPPRECHT.